(12) United States Patent
Gobrecht et al.

(10) Patent No.: US 8,090,545 B2
(45) Date of Patent: Jan. 3, 2012

(54) METHOD AND APPARATUS FOR DETERMINATION OF THE LIFE CONSUMPTION OF INDIVIDUAL COMPONENTS IN A FOSSIL FUELLED POWER GENERATING INSTALLATION, IN PARTICULAR IN A GAS AND STEAM TURBINE INSTALLATION

(75) Inventors: Edwin Gobrecht, Ratingen (DE); Rainer Newald, Erlangen (DE); Eva Windecker, Erlangen (DE)

(73) Assignee: Siemens Aktiengellschaft, Munich (DE)

( * ) Notice: Subject to any disclaimer, the term of this patent is extended or adjusted under 35 U.S.C. 154(b) by 701 days.

(21) Appl. No.: 12/083,666

(22) PCT Filed: Sep. 21, 2006

(86) PCT No.: PCT/EP2006/066599
§ 371 (c)(1),
(2), (4) Date: Apr. 16, 2008

(87) PCT Pub. No.: WO2007/045537
PCT Pub. Date: Apr. 26, 2007

(65) Prior Publication Data
US 2009/0138211 A1    May 28, 2009

(30) Foreign Application Priority Data

Oct. 17, 2005  (EP) .................................... 05022572

(51) Int. Cl.
*G06F 19/00* (2006.01)
*F02C 9/00* (2006.01)
(52) U.S. Cl. ........................ 702/34; 701/100; 60/39.13
(58) Field of Classification Search .................. 702/34, 702/33, 44, 50, 55, 79, 81, 84, 98–100, 105, 702/127, 130–131, 137–140, 142, 145, 147–148, 702/179, 182–183, 189; 703/7, 9, 18; 73/1.16, 1.27–1.28, 1.35, 1.57, 37, 112.01–112.06; 700/108–109, 275, 286–287, 290–291, 296; 701/99–100; 60/39.13, 39.45, 39.64, 39.182, 204, 772–773, 805

See application file for complete search history.

(56) References Cited

U.S. PATENT DOCUMENTS

| | | | |
|---|---|---|---|
| 5,410,883 A | 5/1995 | Nigawara et al. | |
| 6,343,251 B1 * | 1/2002 | Herron et al. | 701/100 |
| 6,719,526 B2 | 4/2004 | Sanborn et al. | |

FOREIGN PATENT DOCUMENTS

| | | |
|---|---|---|
| DE | 44 24 743 A1 | 1/1996 |
| EP | 0 937 194 B1 | 8/1999 |
| EP | 1 431 927 A1 | 6/2004 |

OTHER PUBLICATIONS

Laire CH et al., "Evaluating the condition and remaining life of older Power Plants", VGB Power Tech; Belgian, Oct. 2001, pp. 98-102, XP1081260.

* cited by examiner

*Primary Examiner* — Michael Nghiem
*Assistant Examiner* — Toan Le

(57) ABSTRACT

A method for prior determination of a life consumption of individual components in a fossil-fuelled power generating installation, with respect to a load cycling process to be carried out is provided. An apparatus is also provided for prior determination of a life consumption of individual components in a fossil-fuelled power generating installation, with respect to a load cycling process to be carried out. Actual variables which characterize the state of the power generating installation before a load cycling process are determined. A driving gear of the power generating installation which creates the load cycling process is set in advance. The load cycle time is calculated based upon the driving gear and the characterizing variables. A predicted life consumption for at least one of the individual components for the selected driving gear is also calculated.

20 Claims, 2 Drawing Sheets

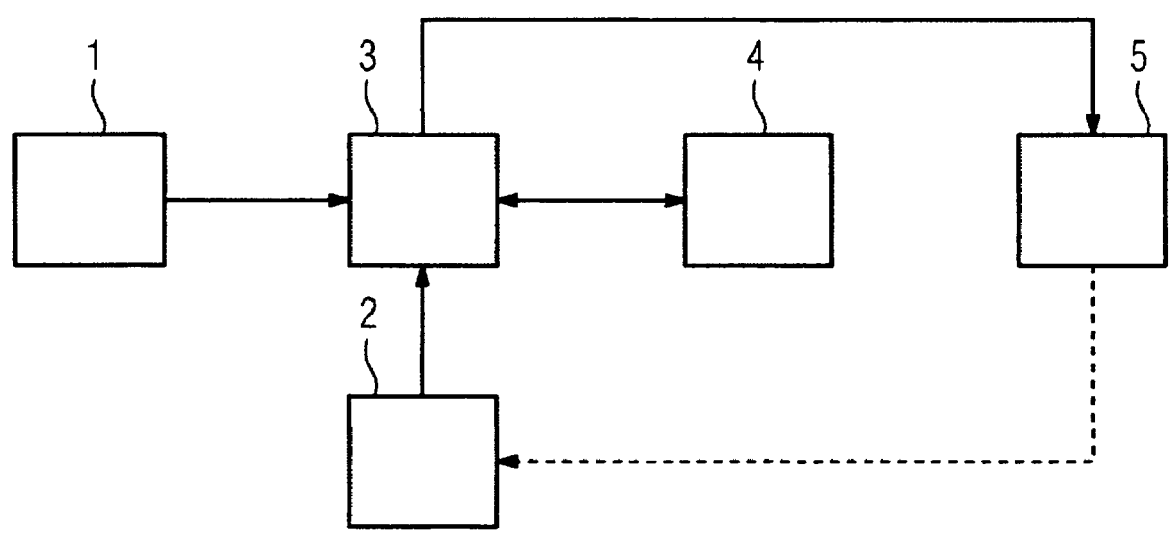

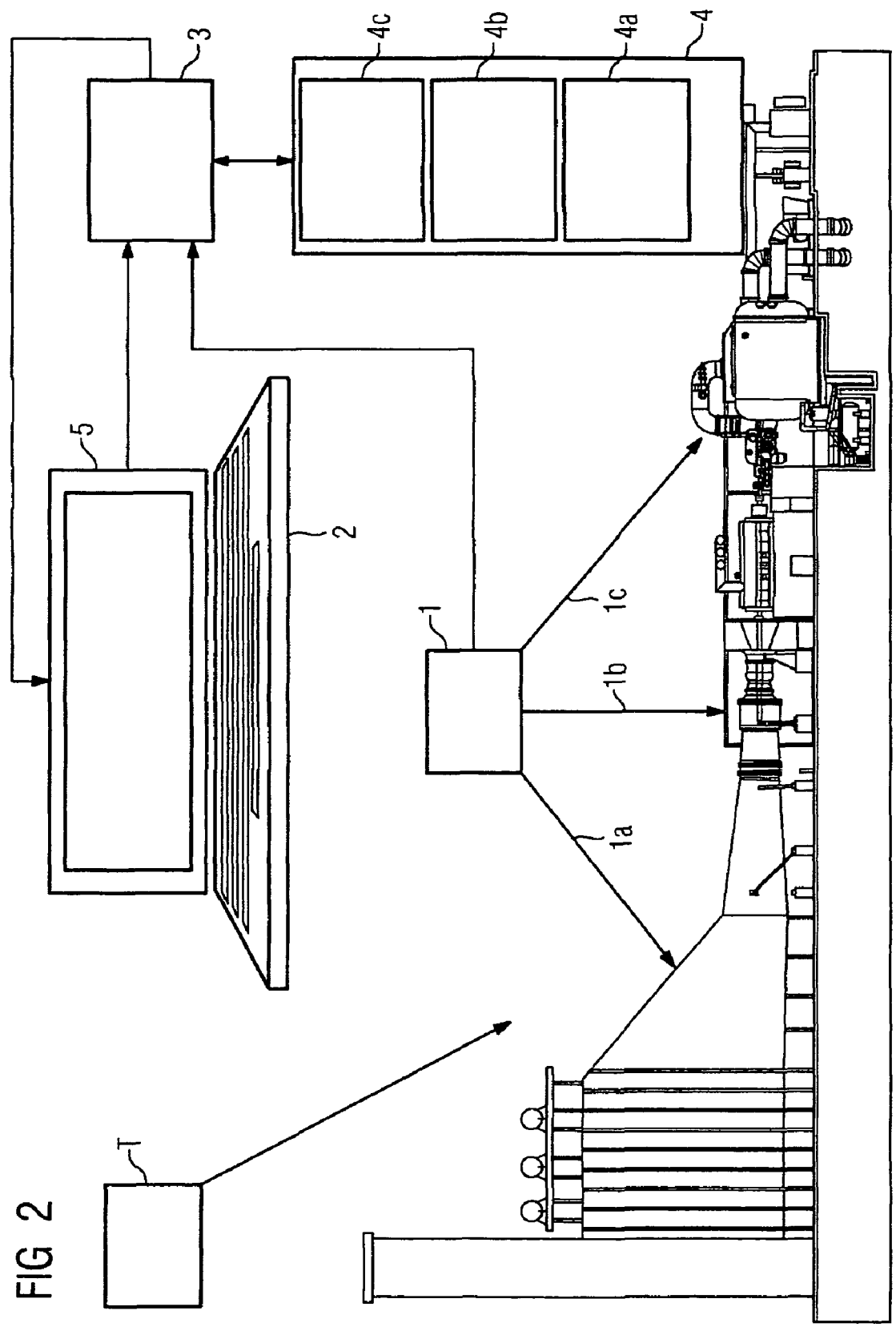

METHOD AND APPARATUS FOR DETERMINATION OF THE LIFE CONSUMPTION OF INDIVIDUAL COMPONENTS IN A FOSSIL FUELLED POWER GENERATING INSTALLATION, IN PARTICULAR IN A GAS AND STEAM TURBINE INSTALLATION

CROSS REFERENCE TO RELATED APPLICATIONS

This application is the US National Stage of International Application No. PCT/EP2006/066599, filed Sep. 21, 2006 and claims the benefit thereof. The International application claims the benefits of European Patent Office application No. 05022572.1 filed Oct. 17, 2005, both of the applications are incorporated by reference herein in their entirety.

FIELD OF INVENTION

The invention relates to a method for prior determination of the life consumption of individual components in a fossil-fuelled power generating installation, with respect to a load cycling process to be carried out. The invention also relates to a method for prior determination of the expected load cycle time in a fossil-fuelled power generating installation. The invention also relates to an apparatus for prior determination of the life consumption of individual components in a fossil-fuelled power generating installation, with respect to a load cycling process to be carried out and to prior determination of the expected load cycle time in a fossil-fuelled power generating installation.

BACKGROUND OF INVENTION

In a gas turbine installation, a gaseous or liquid fuel, for example natural gas or mineral oil, is mixed with compressed air, and is burnt. The pressurized combustion exhaust gases are supplied to the turbine of the gas turbine installation as a working medium. The working medium causes the turbine to rotate as it expands, with thermal energy being converted to mechanical work, specifically rotation of the turbine shaft. When the expanded working medium emerges from the gas turbine installation, it is typically still at a temperature of 500-600° C.

In a gas and steam turbine installation, the expanded working medium, also referred to as flue gas, from the gas turbine installation is used to generate steam for driving a steam turbine. For this purpose, the working medium is supplied to a waste-heat steam generator which follows the gas turbine installation on the exhaust gas side and in which heating surfaces are arranged in the form of tubes or tube bundles. The heating surfaces are in turn connected to a water/steam circuit of the steam turbine installation, which circuit has at least one, but generally more, pressure stage or stages.

At the moment, a gas and steam turbine installation is normally started by starting the gas turbine installation and by supplying the expanded working medium to the waste-heat steam generator of the steam turbine installation. The steam which is generated in the waste-heat steam generator is, however, not supplied first of all to the turbine part of the steam turbine installation, but bypasses it, via bypass stations on the turbine, and is supplied directly to a condenser, which condenses the steam to form water. The steam turbine is not connected until specific steam parameters are complied with in the steam lines of the water steam circuit and/or in the steam lines which lead to the turbine section of the gas turbine installation, for example specific steam pressures and temperatures. Maintenance of these steam parameters is intended to keep possible stresses in thick-walled components at a low level. Once the gas turbine installation has been started, the power rises and this leads to a pressure rise in the steam system. One governing factor for the load gradient which occurs during starting of the gas turbine installation, that is to say the power increase of the gas turbine installation per unit time, is the configuration and method of construction of the waste-heat steam generator and the design limitations within the steam turbine. As the gas turbine load, and therefore the temperature and the volume flow of the exhaust gas emitted from the gas turbine installation, rise, the steam temperature and the pressure in the steam system also increase.

The design of fossil-fuelled power station installations, for example a gas and steam turbine installation, is based inter alia on the expected load cycle. The rates of load change, for example the starting and stopping processes or else individual load cycles, are chosen during the design stage such that the theoretical component life would have been completely used at the end of the planned life of the power station installation. The actual life consumption at any given time can be indicated by life monitoring systems.

The progressive liberalization of the power markets has resulted in the demand for fossil-fuelled power station installations to be started with as fast a starting time as possible and for them to be operated on a load cycle basis, based on the same aspect assumptions, with a fossil-fuelled power station installation. On the basis of the present prior art, load changes occur in a fossil-fuelled power station in accordance with specific permissible limits, for example particularly the stress-critical components of the installation such as the boiler, steam turbine or gas turbine, which are governed by the design of their individual components. These are either calculated as rigid limits in an automation system, or are calculated at the same time by means of an optimization system. One example of this is the calculation of the optimum boiler limits for fired boilers. However, these optimization systems do not provide any information before load cycling and therefore additionally, for example, do not allow the time or the life consumption to be actively influenced as a function of the market requirements.

However, matching rates of load change to the respective actual market requirements results in the life consumption of individual components being influenced deliberately, to a major extent. This results in a requirement for the life consumption of the individual components to be as low as possible during the load cycles that are carried out. This allows the flexibility of a fossil-fuelled power station installation to be considerably increased during starting and in the event of load cycling, contributing to customer usefulness, which actually represents a competitive advantage for an installation such as this in a liberalized electricity market.

By way of example, this is disclosed for a steam turbine in EP 0 937 194 B1. With a time requirement being included, EP 0 937 194 B1 specifies a turbine control device for closed-loop control of a load cycling process in a turbine, by means of which a flexible change in the operating conditions of the turbine is achieved, which complies with the operating requirements to generate electrical power, taking account of the maximum permissible material stress. With the time duration being specified, EP 0 937 194 B1 determines a turbine control variable in the limiting unit for closed-loop control of the load cycling process, which turbine control variable is determined as a function of time in the time duration between leaving the initial state and reaching the intended state.

Furthermore, the material fatigue is determined for the load cycling process to be carried out in accordance with the turbine control variable. The additional material fatigue can therefore be calculated in advance, so that it is possible to use this material fatigue and the operating time of the turbine that is still desired manually or automatically to decide whether the load cycling process should actually be carried out in the desired time period.

SUMMARY OF INVENTION

An object of the invention is to specify a further-improved method for increasing the flexibility, in particular the operational flexibility, of a fossil-fuelled power generating installation, for example a gas and steam turbine installation. A further object is to specify an alternative method. An alternative object is to specify an apparatus for increasing the flexibility of a fossil-fuelled power generating installation. The apparatus is intended to be particularly suitable for carrying out the method and the alternative method.

The object relating to the method is achieved according to the invention by definition of a method for prior determination of the life consumption of individual components in a fossil-fuelled power generating installation, with respect to a load cycling process to be carried out, wherein actual variables which characterize the state of the power generating installation are determined before the load cycling process, wherein a driving gear of the power generating installation which creates the load cycling process is set in advance, with the load cycle time being calculated by means of the driving gear and the characterizing variables, and wherein a predicted life consumption is calculated for at least some of the individual components for the selected driving gear.

The invention is based on the knowledge that, with respect to the more stringent requirements, for example the power requirements of the load distributor, the high fuel costs and the electricity sales prices resulting from a liberalized electricity market, it is necessary to take account not only of the installation operation of a fossil-fuelled power generating installation but also of the life consumption, particularly in the event of load cycling. This is also based on the knowledge that the life consumption of a component in the event of load cycling depends to a major extent on the actual state governing the installation, that is to say on the instantaneous state of the installation, and the components located in it. In the case of a fossil-fuelled power generating installation, therefore, the component temperature and system pressure are, for example tapped off before the load cycling in order to determine in advance the life consumption of individual components, with respect to a load cycling process to be carried out. These characterizing variables are, for example, dependent on the cooling state of the power generating installation while it is stationary, and on the actual operating state of the power generating installation immediately before the load cycling.

Once the characterizing variables have been determined, a driving gear of the power generating installation which creates the load cycling process is set in advance. This driving gear may, for example, comprise the stages of slow, normal or fast load cycling as well as the intended value, that is to say the nominal power value of the installation with respect to the electrical output. However, a different driving gear is also feasible, although this should be within permissible tolerances. Once the driving gear has been set and the characterizing variables have been determined, the load cycle time is calculated, for example, by simulation. A predicated life consumption for at least some of the individual components for the selected driving gear is now calculated with the aid of this data. The calculation can be carried out by a life monitoring system. The method now makes it possible to determine the expected life consumption of individual components, in particular stress-critical components, even before load cycling, and to adapt the driving gear to this. The fossil-fuelled power generating installation can therefore be matched to the more stringent requirements. The increased flexibility of the fossil-fuelled power generating installation likewise improves the competitiveness in a liberalized electricity market, on the one hand at the operator end for example by offering cheaper electricity since monetary assessment of load cycling and a driving gear which reduces life consumption are identified. At the supplier end, an improvement is also achieved by offering a power generating installation which is matched to the customer's requirement profile.

It has been found to be particularly advantageous that the method can be used not only for prior determination of the life consumption of individual components but also for prior determination of other process variables such as the expected fuel consumption and/or the expected power output during load cycling. The prior determination of the life consumption is therefore only one possible process variable which may be considered by preference in this case. The invention allows and also covers methods for prior calculation and consideration of these other said process variables, alternatively or in addition to the life consumption.

As an alternative in one advantageous refinement, rather than entering the selected driving gear, the desired load cycle time and the desired intended power, that is to say a nominal power value, are entered. The predicted life consumption for at least some of the individual components for the selected intended power is calculated in this way. By way of example, simulation can advantageously be used in this case, taking account of the actual variables which characterize the state of the power generating installation, to calculate the necessary load change limits which are in fact reached with this desired process, with the corresponding intended time. The calculated load change limits are stored and can then be saved and used for new calculations.

The object relating to the alternative method is achieved according to the invention by specifying an alternative method for prior determination of the expected load cycle time in a fossil-fuelled power generating installation, with actual variables which characterize the state of the power generating installation being determined before the load cycling process, and with the driving gear and the expected load cycle time being calculated after load cycling, with the desired life consumption of the individual components being entered.

An alternative method in order to increase the flexibility of a power generating installation can be achieved by inputting a desired life consumption. In this case, actual variables which characterize the state of the power generating installation are determined before load cycling. The expected starting time, stopping time and load cycle time are obtained as the result of the prior determination. The calculated load change limits are stored, and can then be saved and used for new calculations.

According to the invention, the object relating to the apparatus is achieved by specifying an apparatus for prior determination of the life consumption of individual components in a fossil-fuelled power generating installation, with respect to a load cycling process to be carried out, comprising an automation system, a computer unit and a life monitoring system, with the automation system being connected to the computer unit for data interchange, and with the computer unit being connected to the life monitoring system for data interchange, thus providing a calculation of a predicted life consumption for at least some of the individual components for the selected driving gear. The apparatus is particularly suitable for carrying out the method described above and the alternatively specified method. The advantages of the method therefore also apply to the apparatus.

BRIEF DESCRIPTION OF THE DRAWINGS

Further features, characteristics and advantages of the invention will become evident from the description of one exemplary embodiment, and from the other dependent claims.

The invention will be explained in more detail in the following text, by way of example, using a drawing.

In the drawing, illustrated in a simplified form and not to scale:

FIG. 1 shows a schematic illustration of the method, and

FIG. 2 shows a schematic illustration of the method and of the apparatus in a gas and steam turbine installation.

Identical parts are provided with the same reference symbols in all the figures.

DETAILED DESCRIPTION OF INVENTION

FIG. 1 shows, schematically, a method for prior determination of the life consumption of individual components in a fossil-fuelled power generating installation, with respect to a load cycling process that is to be carried out. This essentially comprises an automation system 1, a manual input unit 2, a computer unit 3, a life monitoring system 4 and an output unit 5. Even before the actual starting/stopping process or load cycle, the automation system 1 taps off the actual variables of the installation which characterize the state of the power generating installation. These characterizing variables are dependent on the cooling state of the installation while it is stationary, and on the actual operating state of the installation immediately before starting, stopping or before the load cycle. Relevant variables in this case are, for example, the component temperatures and system pressures. A specific driving gear is selected via an input unit 2, for example for slow, normal or fast operation of the installation, and the intended value of the power. In this case, this setting can be carried out manually or automatically. This data is then passed to a computer unit 3. In this case, the computer unit 3 on the one hand calculates variables such as the starting time, stopping time or load cycle time, and on the other hand at the same time simulates the profiles of various parameters relating to the starting/stopping or load cycling process. These parameters are, for example, temperature profiles, pressure profiles and mass-flow profiles in the power station process. The computer unit 3 then, for example, uses the data which is being transmitted to it by the automation system 1 and the input unit 2 to calculate the expected starting, stopping and load cycle time, for example by simulation of the starting, stopping or load cycling process. This is done while complying with the permissible limits, for example temperature rise, pressure rise, etc. . . . which must be taken into account in the installation. In this case, the comput unit 3 communicates with the life monitoring system 4. The results calculated in the computation unit 3 are now at the same time used to calculate the expected life consumption for the individual components when carrying out the load cycling process in the selected driving gear. During this process, the life monitoring system 4 also considers the actual life consumption data. The life consumption of the individual components in the previously selected driving gear can then be presented on an output unit 5. By way of example, this may then be seen by the power station manager. He can then manually decide whether he wishes to retain the selected driving gear or whether he will select a different driving gear via the input unit 2. However, it is also feasible for the computation unit 3 to automatically decide on the basis of previously selected data whether the selected driving gear will be retained.

This method therefore makes it possible to produce a statement relating to the expected life consumption while maintaining the starting/stopping or load cycle time, even before the actual starting/stopping or load cycling of the installation. In addition to being used for prior determination of the life consumption, the method can alternatively or additionally also be used for prior determination of the expected fuel consumption and/or the expected power output during the load cycle. This allows a considerably better prediction than does closed-loop control of the installation operation.

FIG. 2 shows the method in a gas and steam turbine installation T. The automation system 1 in this case taps off the actual installation variables which characterize the state of the power generating installation. These are essentially the waste-heat steam generator 1a, the gas turbine 1b and the steam turbine 1c, and if appropriate the boiler (not illustrated here). In this case, the method takes account of the fact that, for example, the gas turbine 1b cools down considerably more quickly than the boiler or the steam turbine 1c when the installation is stopped. The driving gear is selected by an input unit 2, for example a computer. The data is passed to a calculation unit 3. The calculation unit 3 calculates the expected starting/stopping and/or load cycle time of the entire gas and steam turbine installation, and also splits these times between the gas turbine 1b and the steam turbine 1c or waste-heat steam generator 1a, and the boiler. The actual gas turbine life consumption 4b and the steam turbine life consumption 4c and/or waste-heat steam generator life consumption 4a are/is tapped off in the life monitoring system. At the same time, the results calculated in the computation unit 3 are used to calculate the expected life consumption for the individual components when the load cycling process is carried out in the selected driving gear. The result, that is to say the expected life consumption of the individual components, can now be presented on the output unit 5. The actually selected driving gear can then be retained or changed depending on the result.

The new system provides the power station operator or power station manager with the capability to actively match the method of operation of the installation to the actual requirements on the power station. Requirements such as these result, for example, from power demands from the load distributor, fuel costs or electricity sales prices. Furthermore, the operator or the power station manager has the capability to actively influence the life consumption during operation of the installation and therefore possibly to control maintenance intervals that are becoming due, and to match them to his power station operation plan.

Even before the starting/stopping process or load cycling of the power station, the method provides the capability to simulate the expected process on the basis of the actual installation state, and from this to obtain information about relevant process variables, such as the expected life consumption of individual components and/or the expected fuel consumption and/or the power output during the load cycle. This information, for example, in turn allows a financial assessment of the starting/stopping process or of the load cycling process.

By way of example, the increased installation flexibility also makes it possible to improve the competitiveness of fossil-fuelled power stations such as a gas and steam turbine installation, since installations can be offered which, for example, allow operation precisely matched to the respective requirement profile of the customer.

The invention claimed is:

1. A method for prior determination of a life consumption of individual components in a fossil-fuelled power generating installation, with respect to a load cycling process to be carried out, comprising:
   determining actual variables, using an automation system, which characterize a state of the power generating installation before performing a load cycling process in the power generating installation;
   selecting a driving gear from a plurality of driving gears of the power generating installation;
   setting in advance a selected driving gear of the power generating installation by an input unit which creates the load cycling process;
   calculating the load cycle time based upon the driving gear and the characterizing variables using a computer unit; and
   calculating a predicted life consumption for at least one of the individual components for the selected driving gear using the computer unit and a life monitoring system.

2. The method as claimed in claim 1, wherein a desired load cycle time and a desired intended time are entered rather than the selected driving gear.

3. The method as claimed in claim 1, wherein actual component temperatures are at least a part of the characterizing variables.

4. The method as claimed in claim 1, wherein actual system pressures are at least a part of the characterizing variables.

5. The method as claimed in claim 1, wherein a starting process is carried out by the load cycle.

6. The method as claimed in claim 1, wherein a stopping process is carried out by the load cycle.

7. The method as claimed in claim 1, wherein the load cycle time is calculated based upon a simulation.

8. The method as claimed in claim 1, wherein the life consumption of individual components is controlled by calculating the expected life consumption.

9. The method as claimed in claim 1, further comprising using the method for a power generating installation, wherein the power generating installation has at least one of the items selected from the group consisting of a gas turbine, a waste-heat steam generator, a steam turbine, a boiler, a generator and a transformer.

10. The method as claimed in claim 1, further comprising using the method for a gas turbine, a steam turbine or a gas and steam turbine installation.

11. The method as claimed in claim 1, wherein the expected load cycle time is calculated based upon the desired life consumption of the individual components based upon the load cycle, and wherein the driving gear is adjusted based upon an input of the desired life consumption of the individual components on the basis of the load cycles.

12. An apparatus for prior determination of a life consumption of individual components in a fossil-fuelled power generating installation, with respect to a load cycling process to be carried out, comprising:
   an automation system to determine actual variables which characterize a state of the power generating installation before performing a load cycling process in the power generating installation, wherein the automation system is configured to select a driving gear from a plurality of driving gears of the power generating installation;
   wherein the automation system has an input for a selected driving gear;
   a computer unit connected to the automation system for a data interchange; and
   a life monitoring system connected to the computer unit for data interchange, such that a predicted life consumption is calculated for at least one of the individual components for the selected driving gear.

13. The apparatus as claimed in claim 12, wherein the characterizing variables comprise at least one component temperature of some of the components in a fossil-fuelled power generating installation.

14. The apparatus as claimed in claim 12, wherein the characterizing variables comprise at least one system pressure of the pressures which occur in a fossil-fuelled power generating installation.

15. The apparatus as claimed in claim 12, wherein the desired driving gear is input manually, by means of an operator.

16. The apparatus as claimed in claim 12, wherein the desired driving gear is inputted automatically.

17. The apparatus as claimed in one of claim 12, wherein the computation system calculates a starting time of the fossil-fuelled power generating installation, and wherein the computation system calculates a stopping time of the fossil-fuelled power generating installation.

18. The apparatus as claimed in claim 17, further comprising a simulation unit.

19. The apparatus as claimed in claim 18, further comprising an input unit and an output unit to interchange data with the computer unit.

20. The apparatus as claimed in claim 19, further comprising an output unit to interchange data with the life monitoring system.

* * * * *